US009555766B2

(12) United States Patent
Yamamoto

(10) Patent No.: US 9,555,766 B2
(45) Date of Patent: Jan. 31, 2017

(54) SEATBELT RETRACTOR AND SEATBELT ASSEMBLY INCLUDING SAME

(71) Applicant: TAKATA CORPORATION, Tokyo (JP)

(72) Inventor: Tetsuya Yamamoto, Tokyo (JP)

(73) Assignee: TAKATA CORPORATION (JP)

( * ) Notice: Subject to any disclaimer, the term of this patent is extended or adjusted under 35 U.S.C. 154(b) by 0 days.

(21) Appl. No.: 15/021,637

(22) PCT Filed: Jul. 24, 2014

(86) PCT No.: PCT/JP2014/069593
§ 371 (c)(1),
(2) Date: Mar. 11, 2016

(87) PCT Pub. No.: WO2015/037338
PCT Pub. Date: Mar. 19, 2015

(65) Prior Publication Data
US 2016/0221532 A1    Aug. 4, 2016

(30) Foreign Application Priority Data
Sep. 13, 2013  (JP) ................. 2013-190085

(51) Int. Cl.
B60R 22/28    (2006.01)
B60R 22/46    (2006.01)
(Continued)

(52) U.S. Cl.
CPC ............ *B60R 22/28* (2013.01); *B60R 22/341* (2013.01); *B60R 22/38* (2013.01); *B60R 22/405* (2013.01);
(Continued)

(58) Field of Classification Search
CPC ........ B60R 22/28; B60R 22/38; B60R 22/341; B60R 22/4676; B60R 22/4633; B60R 22/405; B60R 22/46; B60R 2022/287
See application file for complete search history.

(56) References Cited

U.S. PATENT DOCUMENTS 6,250,579 B1 * 6/2001 Bannert .............. B60R 22/3413
242/379.1
8,905,430 B2 * 12/2014 Ishikawa ............... B60R 21/215
280/728.3
(Continued)

FOREIGN PATENT DOCUMENTS

JP    H11-286259 A    10/1999
JP    2001-233170 A    8/2001
(Continued)

OTHER PUBLICATIONS

International Search Report date of mailing Oct. 28, 2014 for PCT/JP2014/069593 and English translation of the same. (3 pages).

Primary Examiner — Darlene P Condra
(74) Attorney, Agent, or Firm — Fitch Even Tabin & Flannery LLP

(57) ABSTRACT

A seatbelt retractor is provided that can be formed in a smaller size yet properly operated, and capable of smoothly providing seatbelt tension, and a seatbelt assembly including such a seatbelt retractor. The seatbelt retractor includes a frame, a seatbelt, a spool that takes up the seatbelt, the spool being rotatably supported by the frame, a lock mechanism that allows the spool to rotate in a non-activated state and restricts, upon being activated, the spool from rotating in the seatbelt withdrawal direction, and an energy absorption mechanism that limits the load applied to the seatbelt to thereby absorb and alleviate energy of the occupant, and the energy absorption mechanism includes a first torsion bar concentrically enclosed in the spool with one end portion retained by the spool and the other end portion disposed to be locked by the lock mechanism, and disposed to be rotated by torsional force, a second torsion bar eccentrically enclosed in the spool with one end portion 24a disposed to
(Continued)

be locked by the lock mechanism, and disposed to be rotated by torsional force, and a moving member that rotates interlocked with the spool, and moves between the first position for retaining the other end portion of the second torsion bar and the second position spaced from the other end portion of the second torsion bar.

7 Claims, 20 Drawing Sheets

(51) Int. Cl.
  *B60R 22/405* (2006.01)
  *B60R 22/34* (2006.01)
  *B60R 22/38* (2006.01)
(52) U.S. Cl.
  CPC ............ *B60R 22/46* (2013.01); *B60R 22/4633* (2013.01); *B60R 22/4676* (2013.01); *B60R 2022/287* (2013.01)

(56) References Cited

U.S. PATENT DOCUMENTS

| | | | |
|---|---|---|---|
| 2006/0022078 A1* | 2/2006 | Kitazawa | B60R 22/3413 242/382 |
| 2007/0051840 A1* | 3/2007 | Hiramatsu | B60R 22/4676 242/374 |
| 2010/0301152 A1* | 12/2010 | Fleischmann | B60R 22/38 242/379.1 |

FOREIGN PATENT DOCUMENTS

| | | |
|---|---|---|
| JP | 2001-233173 A | 8/2001 |
| JP | 2001-354111 A | 12/2001 |
| JP | 2002-053007 A | 2/2002 |
| JP | 2011-037411 A | 2/2011 |

\* cited by examiner

SEATBELT RETRACTOR AND SEATBELT ASSEMBLY INCLUDING SAME

CROSS-REFERENCE TO RELATED APPLICATIONS

This application is a U.S. National Phase Patent Application of International Patent Application Number PCT/JP2014/069593, filed on Jul. 24, 2014, which claims priority of Japanese Patent Application Number 2013-190085, filed Sep. 13, 2013, which are hereby incorporated herein by reference in their entirety.

TECHNICAL FIELD

The present invention relates to a technical field of a seatbelt retractor that allows a seatbelt to be retracted and withdrawn, and more particularly to a seatbelt retractor including an energy absorption mechanism (hereinafter, EA mechanism as the case may be) configured to limit, when restricting the withdrawal of the seatbelt in an emergency case, such as collision, where a large deceleration force is exerted on the vehicle while the seatbelt is worn by the occupant, a load applied to the seatbelt using an energy absorbing member such as a torsionally deformable torsion bar, to thereby absorb and alleviate the energy of the occupant, and to a seatbelt assembly including such a seatbelt retractor.

BACKGROUND ART

A seatbelt assembly conventionally equipped in a vehicle such as an automobile is designed to bind the occupant with the seatbelt in the emergency case, to prevent the occupant from being thrown out of the seat.

Such a seatbelt assembly includes a seatbelt retractor that retracts the seatbelt. In the seatbelt retractor, the seatbelt is wound around a spool when not in use, and withdrawn to be worn by the occupant when in use. In an emergency case as cited above, a locking device of the seatbelt retractor is activated so as to restrict the spool from rotating in the direction to withdraw the belt, thereby restricting the withdrawal of the seatbelt. Thus, the seatbelt binds the occupant in the emergency case.

In relation to the seatbelt retractor of the conventional seatbelt assembly, when the seatbelt binds the occupant in an emergency case such as vehicle collision, large vehicle deceleration is generated and hence the occupant is urged to move forward by large inertia. Accordingly, the seatbelt is subjected to a large load and the occupant is subjected to a large amount of energy from the seatbelt. Although such energy is not a critical issue to the occupant, it is preferable that the energy is limited.

Therefore, conventionally a torsion bar is provided in the seatbelt retractor, so as to limit the load applied to the seatbelt in an emergency case that happens while the seatbelt is worn by the occupant, thus to absorb and alleviate the energy.

However, in the conventional seatbelt retractors only a single load limit is specified with respect to a case of collision. Actually, the energy imposed on the occupant varies depending, for example, on the body weight of the occupant. Therefore, setting different load limits, instead of just one, in accordance with the situation of the emergency case to cope with the large energy that varies depending on the situation allows the occupant to be bound more effectively and more properly.

Accordingly, seatbelt retractors that allows setting of various limits to the load applied to the seatbelt have been proposed (see, for example, PTL 1).

The seatbelt retractor according to PTL 1 includes a pair of EA mechanisms having different EA characteristics, and one or both of the EA mechanisms are activated depending on the situation of the emergency case. Selectively activating the pair of EA mechanisms allows the load limit on the seatbelt to be set in two stages, depending on the situation of the emergency case.

CITATION LIST

Patent Literature

PTL 1: U.S. Patent Application Publication No. 2010/0301152

SUMMARY OF INVENTION

However, the structure of the seatbelt retractor according to PTL 1 requires a large space. For example, the second torsion bar described in PTL 1 is located on an outer side of the outer circumference of the shaft, which leads to an increase in size of the seatbelt retractor.

The present invention has been accomplished in view of the foregoing situation, and provides a seatbelt retractor configured to allow different load limits on the seatbelt to be set depending on the situation of the emergency case, yet formed in a smaller size, and a seatbelt assembly that includes such a seatbelt retractor.

In an aspect, the present invention provides a seatbelt retractor including a frame, a seatbelt, a spool that takes up the seatbelt, the spool being rotatably supported by the frame, a lock mechanism that allows the spool to rotate in a non-activated state and restricts, upon being activated, the spool from rotating in a seatbelt withdrawal direction, and an energy absorption mechanism that limits a load applied to the seatbelt to thereby absorb and alleviate energy of an occupant. The energy absorption mechanism includes a first torsion bar concentrically enclosed in the spool with one end portion retained by the spool and the other end portion disposed to be locked by the lock mechanism, and disposed to be rotated by torsional force, a second torsion bar eccentrically enclosed in the spool with one end portion disposed to be locked by the lock mechanism, and disposed to be rotated by torsional force, and a moving member that rotates interlocked with the spool, and moves between a first position for retaining the other end portion of the second torsion bar and a second position spaced from the other end portion of the second torsion bar.

In the seatbelt retractor according to the present invention, the energy absorption mechanism may include a first gear that retains the other end portion of the first torsion bar, the first gear being disposed to be locked by the lock mechanism, and a second gear meshed with the first gear and retaining the one end portion of the second torsion bar.

In the seatbelt retractor according to the present invention, the energy absorption mechanism may include a pressing member that moves the moving member to the first position and the second position, a drive mechanism that drives the pressing member, and a housing movably supporting the pressing member and accommodating therein the drive mechanism.

In the seatbelt retractor according to the present invention, the housing may include a cam portion spaced from the pressing member before the drive mechanism is activated, and contacted by the pressing member when the drive mechanism is activated.

The seatbelt retractor according to the present invention may further include an occupant information acquisition unit that acquires occupant information, and a control unit that decides whether the information acquired by the occupant information acquisition unit satisfies a predetermined condition, and moves the moving member, depending on a decision result, to the first position for retaining the other end portion of the second torsion bar and the second position spaced from the other end portion of the second torsion bar.

The seatbelt retractor according to the present invention may further include a pretensioner mechanism that rotates the spool in a seatbelt retracting direction in an emergency case, and the control unit may decide whether the information acquired by the occupant information acquisition unit satisfies the predetermined condition, after activating the pretensioner mechanism in the emergency case.

In another aspect, the present invention provides a seatbelt assembly including at least a seatbelt for binding an occupant, a seatbelt retractor that withdrawably retracts the seatbelt and restricts the seatbelt from being withdrawn upon being activated in an emergency case, a tongue slidably supported by the seatbelt withdrawn from the seatbelt retractor, and a buckle attached to a vehicle body or a vehicle seat to be removably engaged with the tongue. In the seatbelt assembly, one of the foregoing seatbelt retractors is employed as the seatbelt retractor.

The seatbelt retractor thus configured according to the present invention includes the frame, the seatbelt, the spool that takes up the seatbelt, the spool being rotatably supported by the frame, the lock mechanism that allows the spool to rotate in a non-activated state and restricts, upon being activated, the spool from rotating in the seatbelt withdrawal direction, and the energy absorption mechanism that limits the load applied to the seatbelt to thereby absorb and alleviate energy of the occupant, and the energy absorption mechanism includes the first torsion bar concentrically enclosed in the spool with one end portion retained by the spool and the other end portion disposed to be locked by the lock mechanism, and disposed to be rotated by torsional force, the second torsion bar eccentrically enclosed in the spool with one end portion disposed to be locked by the lock mechanism, and disposed to be rotated by torsional force, and the moving member that rotates interlocked with the spool, and moves between the first position for retaining the other end portion of the second torsion bar and the second position spaced from the other end portion of the second torsion bar. Therefore, the seatbelt retractor can be formed in a smaller size, yet can be properly operated, and is capable of smoothly providing the seatbelt tension.

In the seatbelt retractor according to the present invention, the energy absorption mechanism includes the first gear that retains the other end portion of the first torsion bar, the first gear being disposed to be locked by the lock mechanism, and the second gear meshed with the first gear and retaining the one end portion of the second torsion bar. Therefore, the first torsion bar and the second torsion bar can be securely connected to each other.

In the seatbelt retractor according to the present invention, the energy absorption mechanism includes the pressing member that moves the moving member to the first position and the second position, the drive mechanism that drives the pressing member, and the housing movably supporting the pressing member and accommodating therein the drive mechanism. Therefore, the pressing member can be driven to move the moving member by the drive mechanism mounted in the solid housing, and thus the components interact more properly with each other to perform accurate operations.

In the seatbelt retractor according to the present invention, the housing includes the cam portion spaced from the pressing member before the drive mechanism is activated, and contacted by the pressing member when the drive mechanism is activated. Moving thus the moving member by bringing the pressing member into contact with the cam portion allows a more accurate operation to be performed.

The seatbelt retractor according to the present invention further includes the occupant information acquisition unit that acquires occupant information, and the control unit that decides whether the information acquired by the occupant information acquisition unit satisfies the predetermined condition, and moves the moving member, depending on the decision result, to the first position for retaining the other end portion of the second torsion bar and the second position spaced from the other end portion of the second torsion bar. Therefore, the seatbelt retractor can be controlled in accordance with the condition of the occupant, thus to be more properly operated.

The seatbelt retractor according to the present invention further includes the pretensioner mechanism that rotates the spool in the seatbelt retracting direction in an emergency case, and the control unit may decide whether the information acquired by the occupant information acquisition unit satisfies the predetermined condition, after activating the pretensioner mechanism in the emergency case. The mentioned configuration enables the seatbelt to be quickly retracted in the emergency case.

The seatbelt assembly including the foregoing seatbelt retractor, which can be formed in a smaller size, allows the components of the seatbelt assembly to be arranged with a higher degree of designing freedom.

DESCRIPTION OF EMBODIMENTS

Hereafter, embodiments of the present invention will be described with reference to the drawings.

Figure 1:
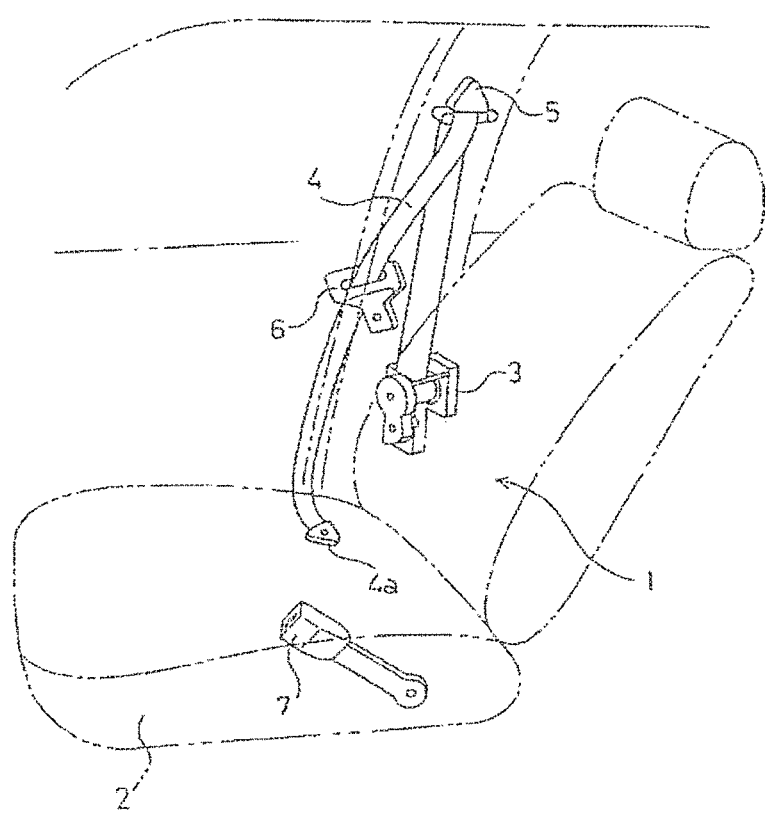
FIG. 1 is a schematic perspective view showing a seatbelt assembly including a seatbelt retractor according to an embodiment of the present invention.

FIG. 1 is a schematic perspective view showing a seatbelt assembly including a seatbelt retractor according to an embodiment of the present invention.

As shown in FIG. 1, the seatbelt assembly 1 according to this embodiment is a known three-point seatbelt assembly. The seatbelt assembly 1 includes a vehicle seat 2, a seatbelt retractor 3 provided close to the vehicle seat 2, a seatbelt 4 withdrawably retracted in the seatbelt retractor 3 and including a seatbelt anchor 4a fixed to a vehicle floor or the vehicle seat 2, a guide anchor 5 that guides the seatbelt 4 withdrawn from the seatbelt retractor 3 to the shoulder of an occupant, a tongue 6 slidably supported by the seatbelt 4 guided from the guide anchor 5, and a buckle 7 fixed to the vehicle floor or the vehicle seat, and in which the tongue 6 is removably inserted. The wearing action and releasing action of the seatbelt 4 of the seatbelt assembly 1 are also the same as those of the known seatbelt assemblies.

Figure 2:
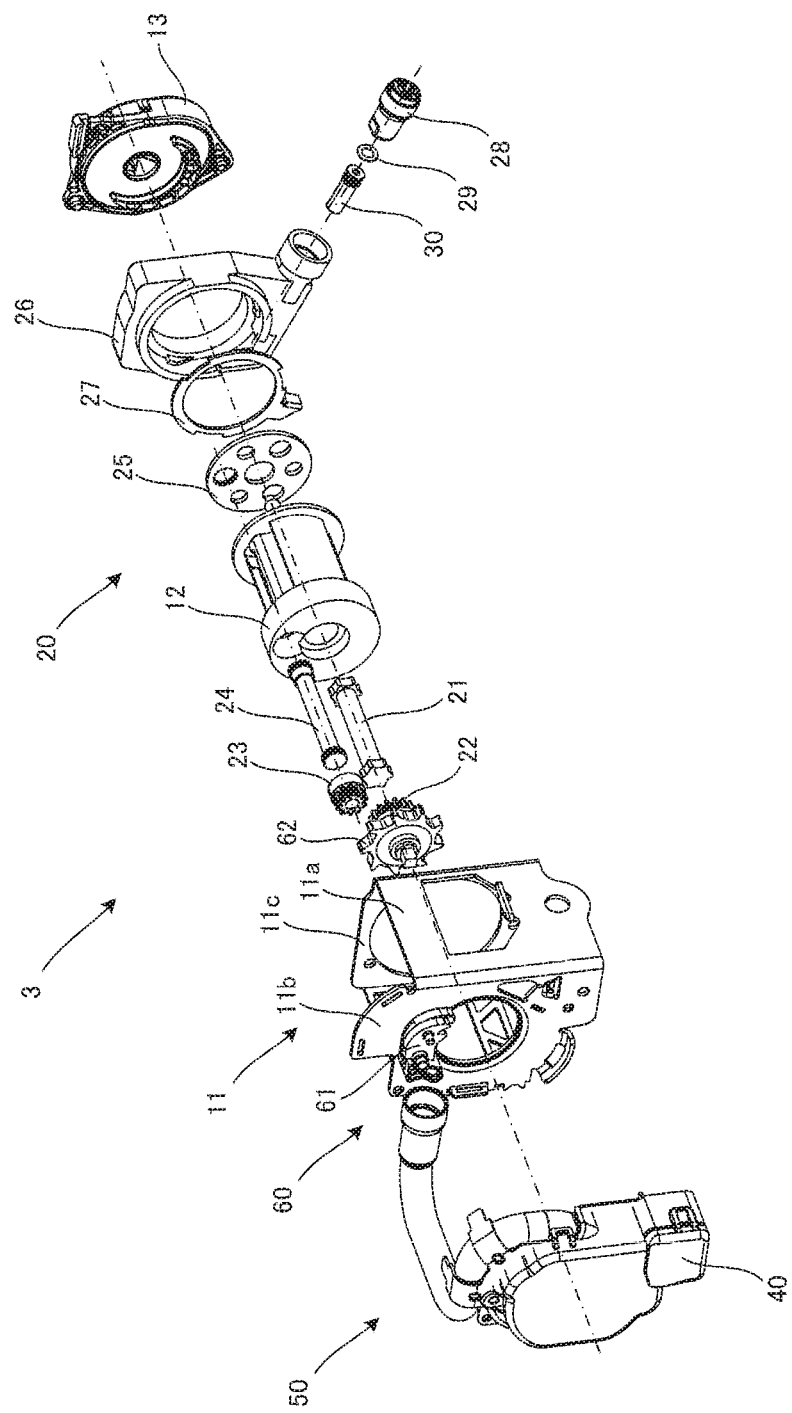
FIG. 2 is an exploded perspective view of the seatbelt retractor according to the embodiment.

FIG. 2 is an exploded perspective view of the seatbelt retractor according to this embodiment.

As shown in FIG. 2, the seatbelt retractor 3 according to this embodiment includes a frame 11, a spool 12, a spring chamber 13, an EA mechanism 20, a deceleration sensor 40, a pretensioner mechanism 50, and a lock mechanism 60.

The frame 11 includes a back plate 11a, and left and right sidewalls 11b, 11c extending from the respective side edges of the back plate 11a orthogonally thereto, thus having a channel-shaped cross section. The left and right sidewalls 11b, 11c of the frame 11 each include a circular opening.

The spool 12 includes an intermediate portion 12a, a first flange 12b attached to one end of the intermediate portion 12a, a second flange 12c attached to the other end of the intermediate portion 12a, and a shaft portion 12d projecting from the second flange 12c. The spool 12 is disposed so as to rotatably penetrate through the openings of the respective sidewalls of the frame 11.

One end of the seatbelt 4 shown in FIG. 1 is fixed to the outer circumferential surface of the intermediate portion 12a, so that the seatbelt 4 can be wound therearound. The intermediate portion 12a also includes a groove $12a_1$ formed in the axial direction.

The first flange 12b includes a first hole $12b_1$ formed in a central region, and a second hole $12b_2$ formed at a position deviated from the axial center of the spool 12. The first hole $12b_1$ includes a first stepped portion $12b_{11}$ where the diameter is reduced, formed halfway in the axial direction, and the second hole $12b_2$ includes a second stepped portion $12b_{21}$ where the diameter is reduced, formed halfway in the axial direction. The first hole $12b_1$ and the second hole $12b_2$ partially overlap.

The second flange 12c includes a third hole $12c_1$ formed so as to oppose the second hole $12b_2$ of the first flange 12b. In addition, a plurality of column-shaped guide portions $12c_2$ are provided around the shaft portion 12d of the second flange 12c. The guide portions $12c_2$ serve to guide a release ring 25 to be subsequently described when the release ring 25 moves in the axial direction, and may be formed in different shapes without limitation to the column shape.

The spring chamber 13 includes a non-illustrated spring having one end connected to the shaft portion 12d of the spool 12 and the other end attached to a case, so as to bias the spool 12 in a belt retracting direction.

Figure 3:
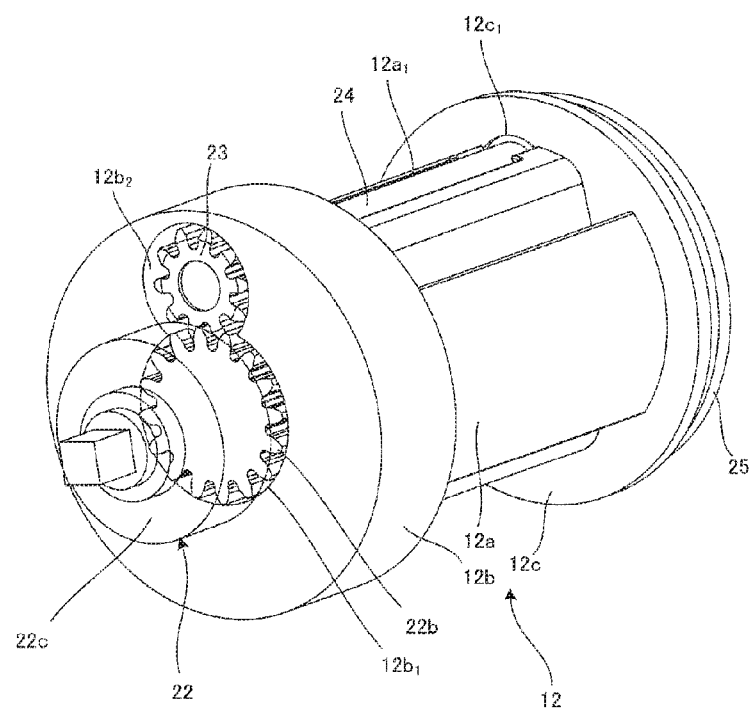
FIG. 3 is a perspective view showing a part of an EA mechanism of the seatbelt retractor according to the embodiment.
Figure 4:
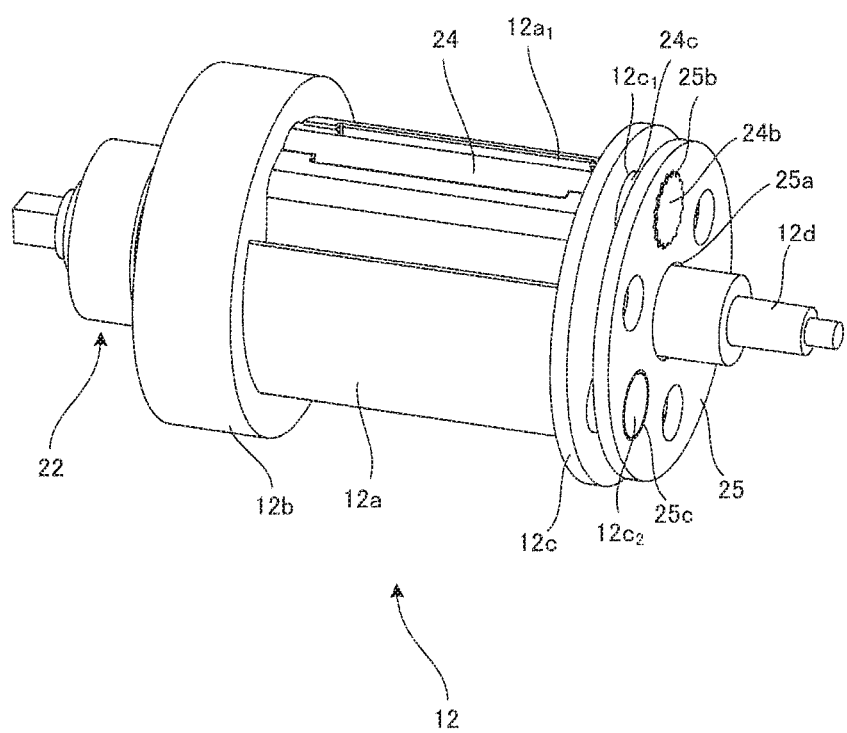
FIG. 4 is a perspective view showing another part of the EA mechanism of the seatbelt retractor according to the embodiment.
Figure 5:
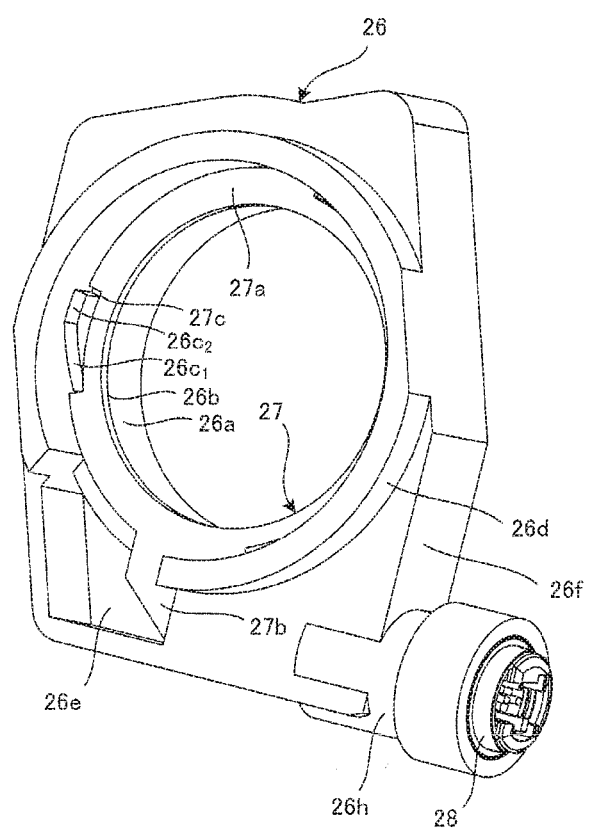
FIG. 5 is a perspective view showing a housing of the EA mechanism of the seatbelt retractor according to the embodiment.
Figure 6:
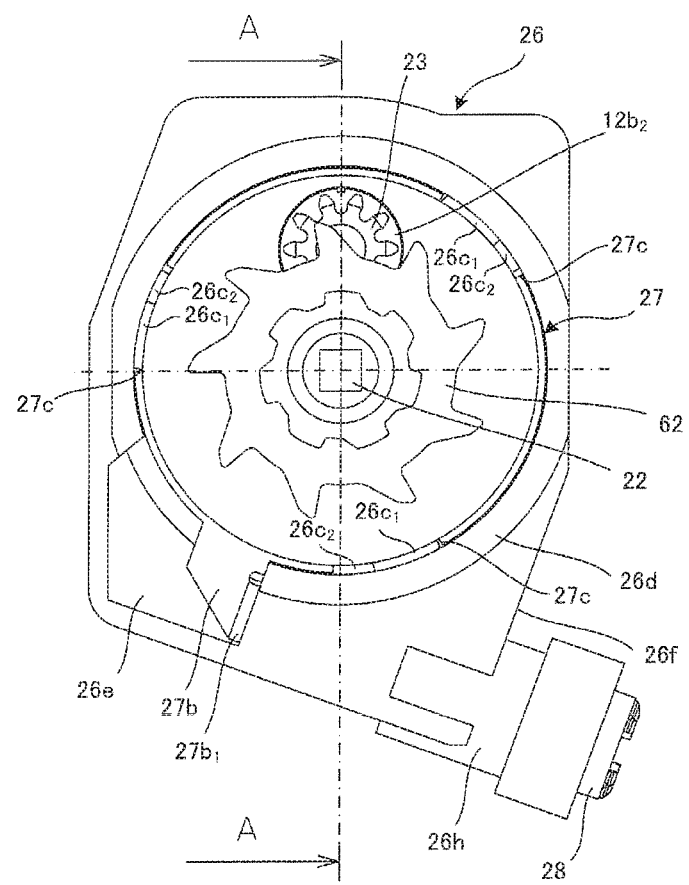
FIG. 6 is a side view showing the EA mechanism of the seatbelt retractor according to the embodiment.
Figure 7:
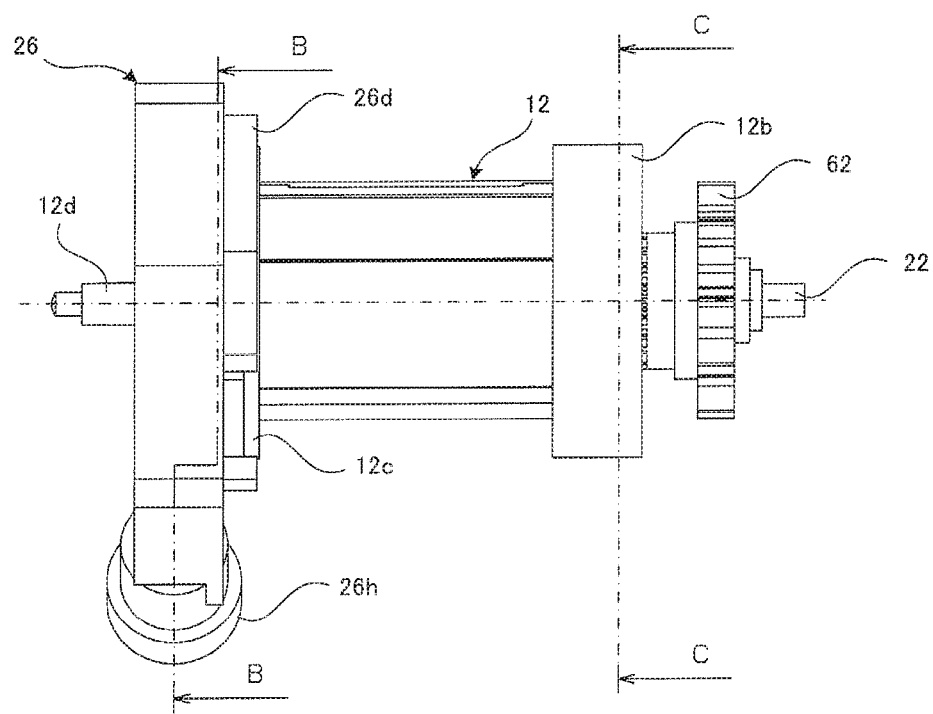
FIG. 7 is a front view showing the EA mechanism of the seatbelt retractor according to the embodiment.
Figure 8:
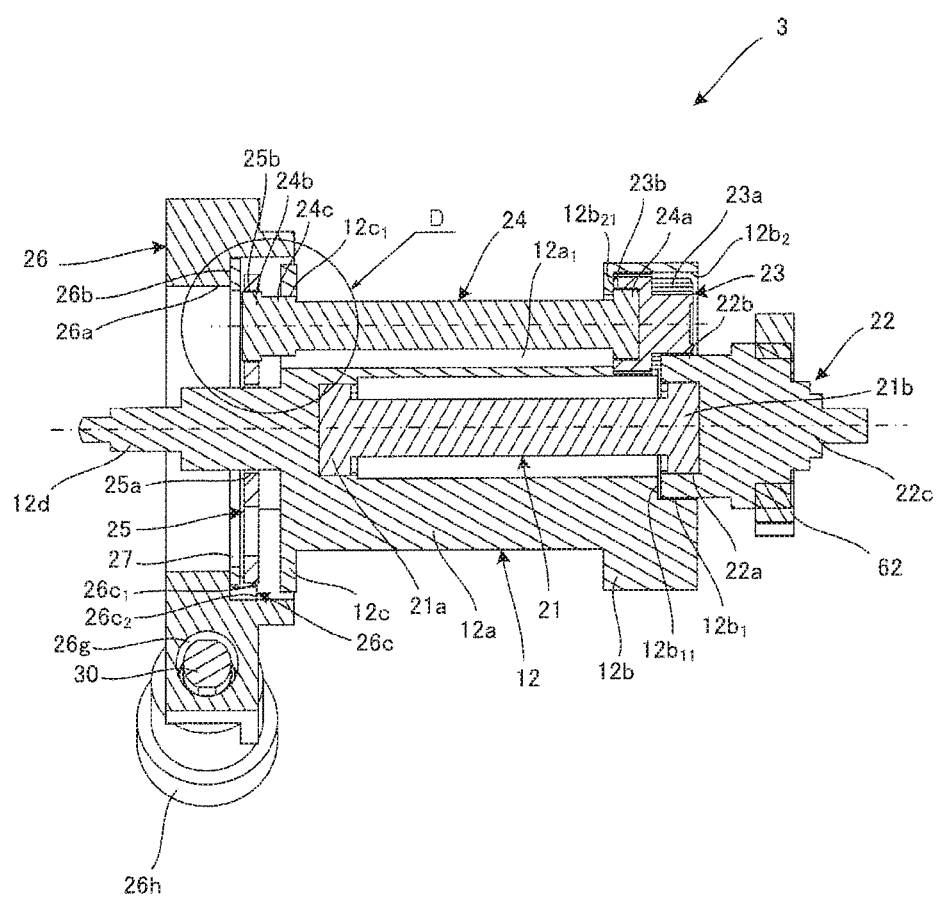
FIG. 8 is a cross-sectional view taken along a line A-A in FIG. 6.
Figure 9:
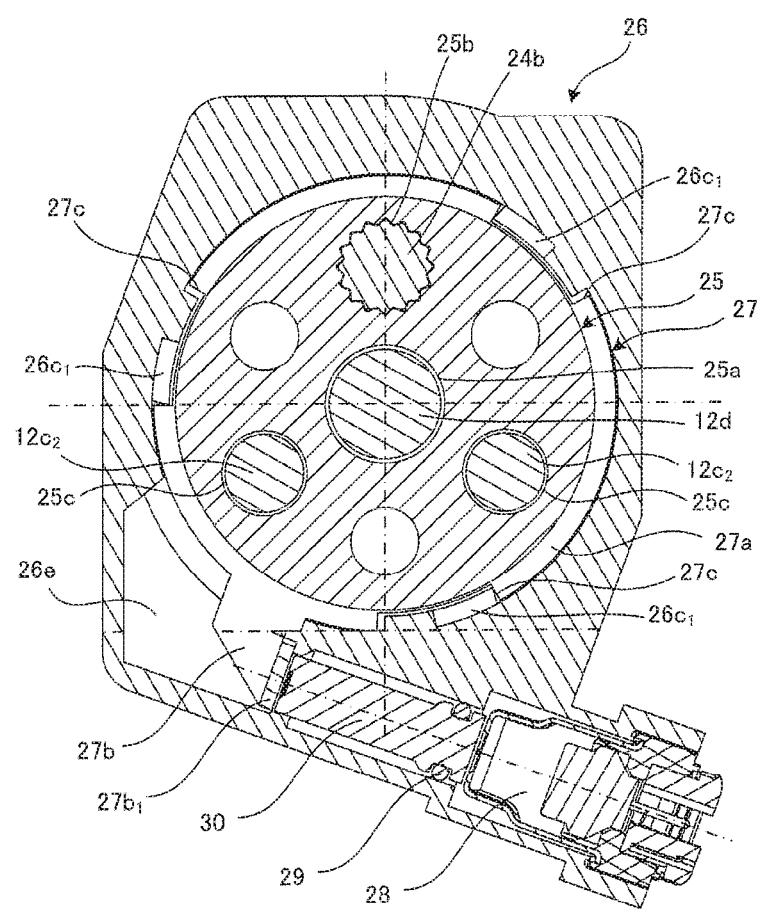
FIG. 9 is a cross-sectional view taken along a line B-B in FIG. 7.
Figure 10:
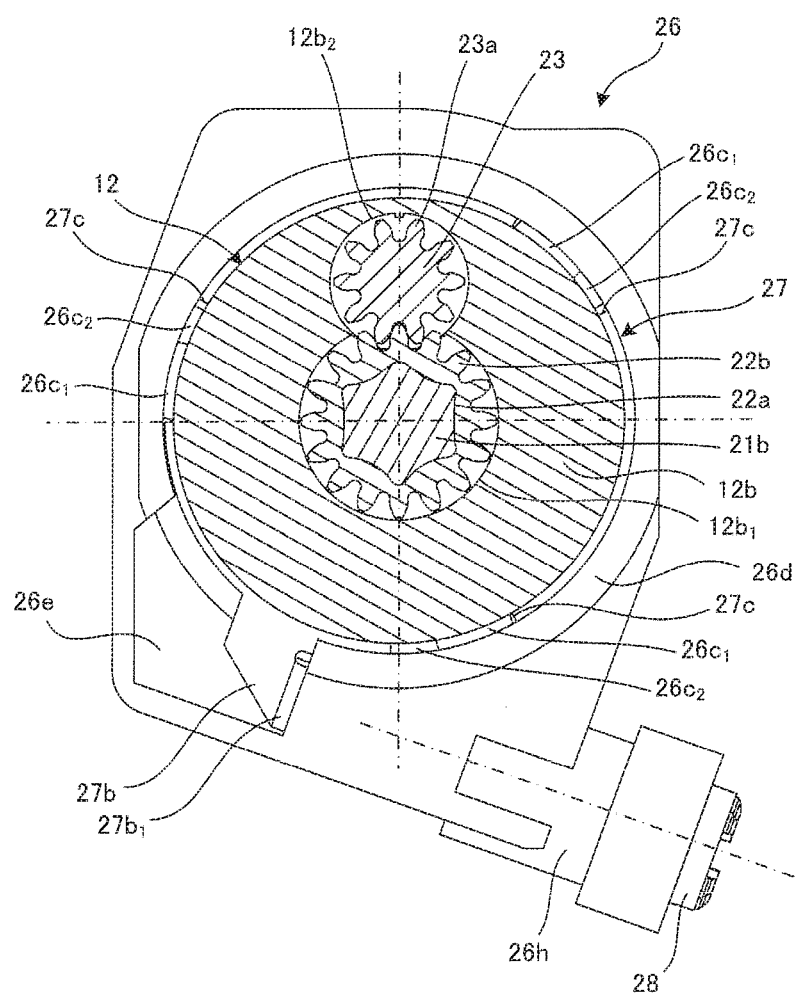
FIG. 10 is a cross-sectional view taken along a line C-C in FIG. 7.
Figure 11:
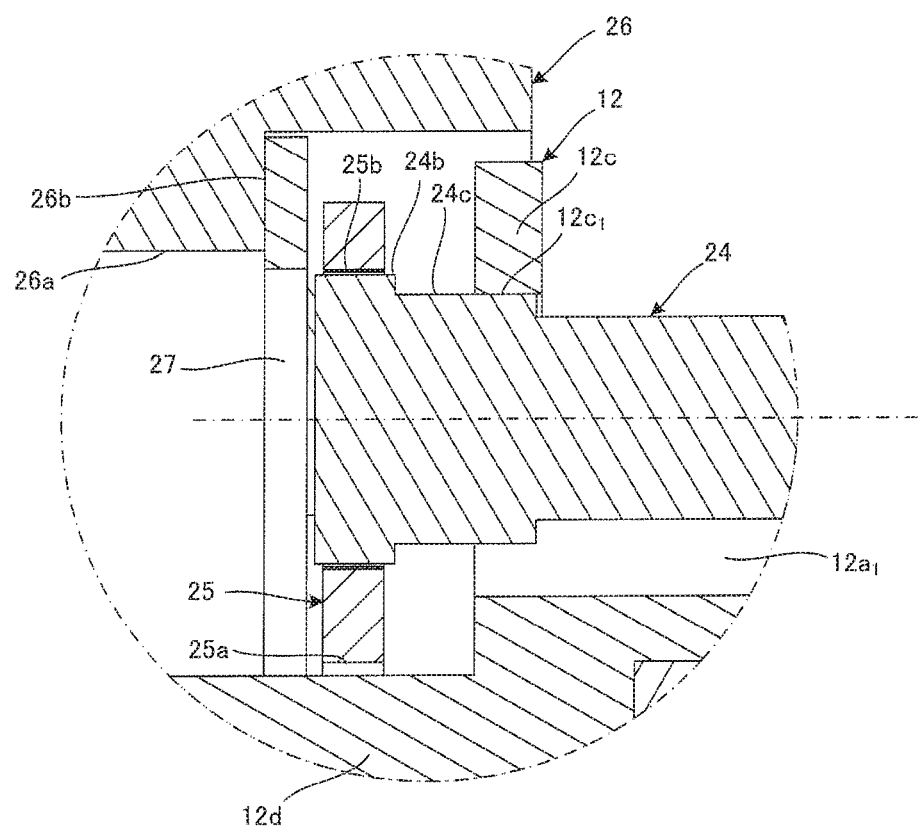
FIG. 11 is an enlarged cross-sectional view of a portion indicated by D in FIG. 8.

FIG. 3 and FIG. 4 are perspective views each showing a part of the EA mechanism 20 of the seatbelt retractor according to this embodiment. FIG. 5 is a perspective view showing a housing of the EA mechanism 20 of the seatbelt retractor according to this embodiment. FIG. 6 is a side view showing the EA mechanism 20 of the seatbelt retractor according to this embodiment. FIG. 7 is a front view showing the EA mechanism 20 of the seatbelt retractor according to this embodiment. FIG. 8 is a cross-sectional view taken along a line A-A in FIG. 6. FIG. 9 is a cross-sectional view taken along a line B-B in FIG. 7. FIG. 10 is a cross-sectional view taken along a line C-C in FIG. 7. FIG. 11 is an enlarged cross-sectional view of a portion indicated by D in FIG. 8.

The EA mechanism 20 includes a first torsion bar 21, a first gear 22, a second gear 23, a second torsion bar 24, the release ring 25, a housing 26, a lever ring 27, a micro gas generator 28, an O-ring 29, and a piston 30. The release ring 25 corresponds to the moving member, the lever ring 27 corresponds to the pressing member, and the micro gas generator 28 corresponds to the drive mechanism.

The first torsion bar 21 is concentrically accommodated inside the intermediate portion 12a of the spool 12. One end portion 21a of the first torsion bar 21 is retained by the second flange 12c of the spool 12 so as to rotate interlocked with the spool 12. The other end portion 21b of the first torsion bar 21 is retained by a first recess 22a of the first gear 22 so as to rotate interlocked with the first gear 22.

The first gear 22 includes the first recess 22a formed on the inner side so as to retain the other end of the first torsion bar 21, and first gear teeth 22b formed along the outer circumference of the portion corresponding to the first recess 22a. The first gear 22 also includes a shaft portion 22c formed on the opposite side of the first recess 22a. The first gear 22 is attached to the first torsion bar 21 so as to cover the one end of the intermediate portion 12a inside the first hole $12b_1$ of the first flange $12b$ of the spool 12. The spool 12 and the first gear 22 are assembled so as to rotate relative to each other.

The second gear 23 includes second gear teeth $23a$ formed along the outer circumference of one end portion in the axial direction, and a second recess $23b$ formed inside the other end portion. The second gear 23 is accommodated inside the second hole $12b_2$ of the first flange $12b$ of the spool 12. The second gear teeth $23a$ are meshed with the first gear teeth $22b$ of the first gear 22, in the region where the first hole $12b_1$ and the second hole $12b_2$ overlap. The second recess $23b$ retains one end of the second torsion bar 24.

The second torsion bar 24 is accommodated in the groove $12a_1$ formed in the intermediate portion $12a$ of the spool 12, at a position deviated from the axial center of the spool 12. One end portion $24a$ of the second torsion bar 24 is retained by the second recess $23b$ of the second gear 23, and the other end portion $24b$ is disposed so as to penetrate through the third hole $12c_1$ of the second flange $12c$ and normally retained by the release ring 25. In addition, the second torsion bar 24 includes a minor-diameter portion $24c$ smaller in diameter than the other end portion $24b$, formed on the inner side the other end portion $24b$ in the axial direction.

The release ring 25 includes a central hole $25a$ through which the shaft portion $12d$ projecting from the second flange $12c$ of the spool 12 is passed. The release ring 25 also includes a retention hole $25b$ for retaining the second torsion bar 24 formed so as to oppose the third hole $12c_1$ of the second flange $12c$, and a plurality of minor holes $25c$ formed around the central hole $25a$, through each of which the guide portion $12c_2$ of the second flange $12c$ is passed.

The release ring 25 is movable in the axial direction of the spool 12. When the retention hole $25b$ of the release ring 25 and the other end portion $24b$ of the second torsion bar 24 are engaged with each other, the second torsion bar 24 is retained so as to rotate interlocked with the release ring 25. Accordingly, the second gear 23 that rotates interlocked with the second torsion bar 24 is disabled from rotating.

When the release ring 25 moves in the axial direction so that the retention hole $25b$ of the release ring 25 comes to the position opposite the minor-diameter portion $24c$ of the second torsion bar 24 and that the second torsion bar 24 and the release ring 25 are separated from each other, the second torsion bar 24 freely rotates with respect to the release ring 25. Accordingly, the second torsion bar 24 is allowed to rotate interlocked with the second gear 23.

The housing 26 includes a through hole $26a$. The through hole $26a$ includes an annular stepped portion $26b$ formed along the inner circumferential surface, and the annular stepped portion $26b$ includes a plurality of cam portions $26c$ each including a sloped surface $26c_1$ extending in the circumferential direction, and a top surface $26c_2$ located at the uppermost portion of the sloped surface $26c_1$. In addition, an annular protruding portion $26d$ is formed along the outer circumference of the through hole $26a$. The annular protruding portion $26d$ includes a gap, and a lever stroke region $26e$ is provided on the outer side of the gap, for a lever portion $27b$ of the lever ring 27 to move therein. The housing 26 also includes a communication hole $26g$ communicating between the outer surface $26f$ of the housing 26 and the lever stroke region $26e$, and a gas generator mounting base $26h$ is attached to the communication hole $26g$.

The lever ring 27 includes a ring portion $27a$, the lever portion $27b$, and a cutaway portion $27c$, and is located adjacent to the release ring 25. The ring portion $27a$ is an annular portion concentrically placed in the housing 26 and superposed on the release ring 25. The lever portion $27b$ radially protrudes outward from the outer circumference of the ring portion $27a$, and located in the lever stroke region $26e$ of the housing 26. An abutment $27b_1$ to be pressed by the piston 30 of the micro gas generator 28 is provided at an end portion of the lever portion $27b$. The cutaway portion $27c$ is formed on the outer circumference of the ring portion $27a$ at a position corresponding to the cam portion $26c$ of the housing 26.

The micro gas generator 28 includes the piston 30 located thereinside, and is mounted on the gas generator mounting base $26h$ via the O-ring 29.

In addition, the seatbelt retractor 3 includes a deceleration sensor 40, a pretensioner mechanism 50, and a lock mechanism 60. These may have known configurations.

The lock mechanism 60 includes a lock pawl 61 and a locking base 62. The lock pawl 61 is rotatably attached to the sidewall of the frame 11. The locking base 62 integrally coupled with the shaft portion $22c$ of the first gear 22. Thus, the locking base 62 and the first gear 22 rotate in an interlocked manner. The lock pawl 61 is meshed with the locking base 62 upon rotating, to thereby lock the rotation of the locking base 62 and the first gear 22.

Hereunder, an operation of the seatbelt retractor 3 according to this embodiment will be described.

In the seatbelt retractor 3 according to this embodiment, first the pretensioner mechanism 50 and the lock mechanism 60 are activated once the deceleration sensor 40 detects large vehicle deceleration generated in an emergency case.

Then the EA mechanism 20 is activated, in which case the EA mechanism 20 according to this embodiment is configured to perform in two modes, namely a first operation mode and a second operation mode.

The first operation mode, in which the micro gas generator 28 is not activated, will be described first.

In the first operation mode, the EA mechanism 20 assumes the state illustrated in FIG. 3 to FIG. 11, because the micro gas generator 28 is not activated. After the pretensioner mechanism 50 is activated and the spool 12 rotates in the retracting direction, the spool 12 is urged to rotate in the belt withdrawal direction because the seatbelt 4 is about to be withdrawn by the inertia of the occupant. However, the locking base 62 and the first gear 22 attached to the first flange $12b$ of the spool 12 are locked by the lock pawl 61.

Accordingly, the first torsion bar 21, having one end portion $21a$ retained by the spool 12 and the other end portion $21b$ retained by the first gear 22, suffers distortion. In other words, the first torsion bar 21 allows the seatbelt 4 to be withdrawn by a predetermined amount, while being subjected to a force limiter load, thereby absorbing the energy.

Since the second gear 23 moves together with the spool 12, the second gear 23 is meshed with the first gear 22 so as to rotate. Accordingly, the second torsion bar 24, having one end portion $24a$ retained by the second gear 23 and the other end portion $24b$ retained by the release ring 25, suffers distortion. Thus, the second torsion bar 24 allows the seatbelt 4 to be withdrawn by a predetermined amount, while being subjected to the force limiter load, thereby absorbing the energy.

As described above, in the first operation mode of the seatbelt retractor 3 according to this embodiment, in which the micro gas generator 28 is not activated, both of the first torsion bar 21 and the second torsion bar 24 act to absorb the energy.

The second operation mode in which the micro gas generator 28 is activated will now be described.

Figure 12:
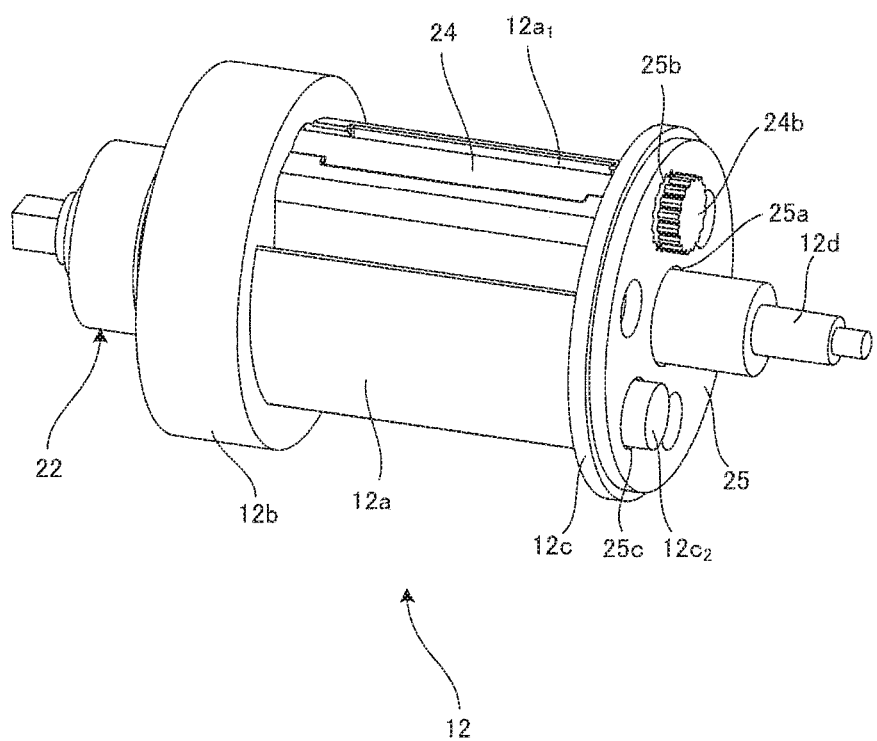
FIG. 12 is a perspective view showing a part of the EA mechanism 20 of the seatbelt retractor according to the embodiment, in a state after a micro gas generator is activated.
Figure 13:
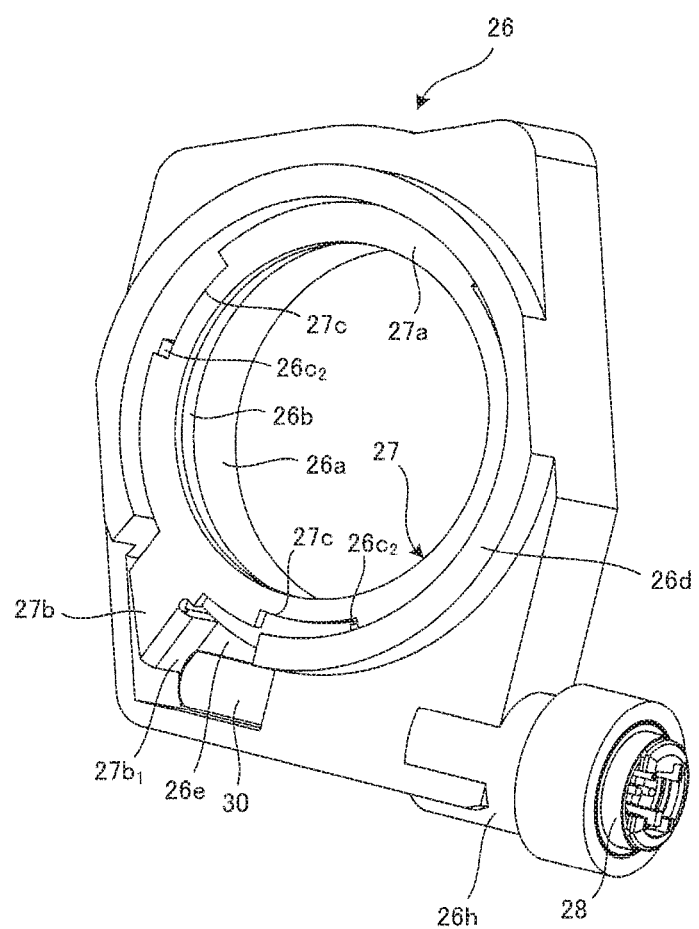
FIG. 13 is a perspective view showing a housing of the EA mechanism 20 of the seatbelt retractor according to the embodiment, in a state after the micro gas generator is activated.
Figure 14:
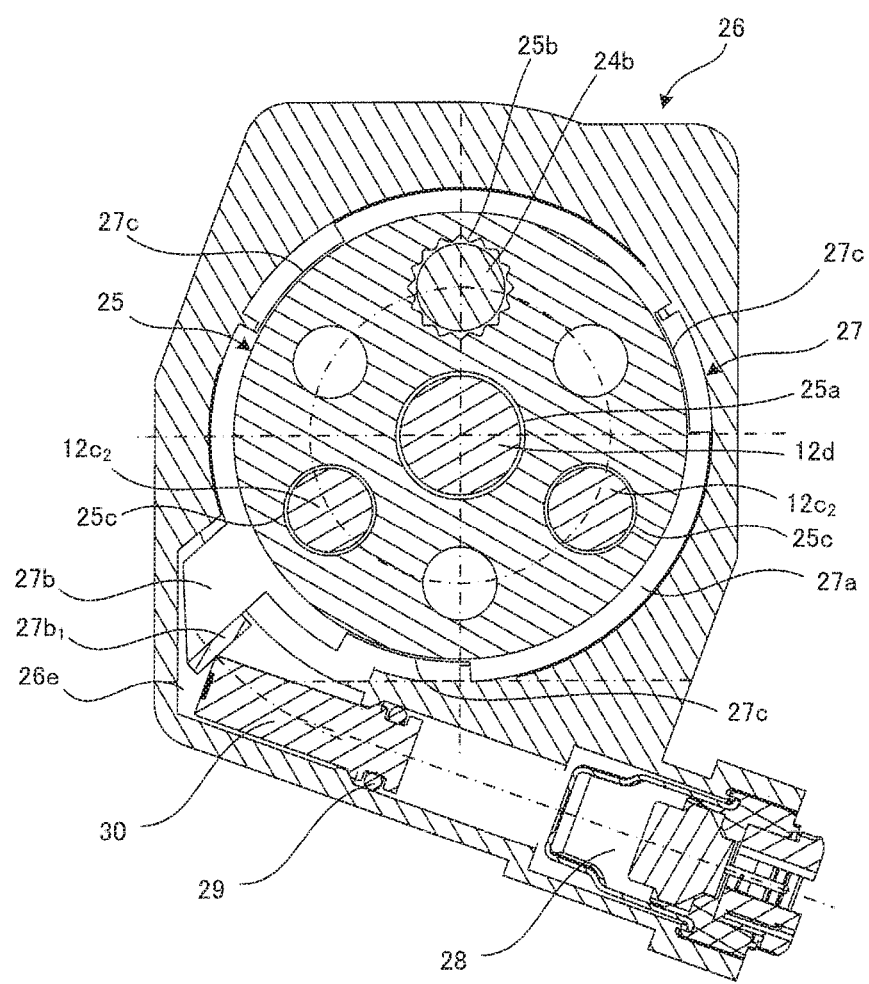
FIG. 14 is a cross-sectional view taken along a line B-B in FIG. 7, showing a state after the micro gas generator is activated.
Figure 15:
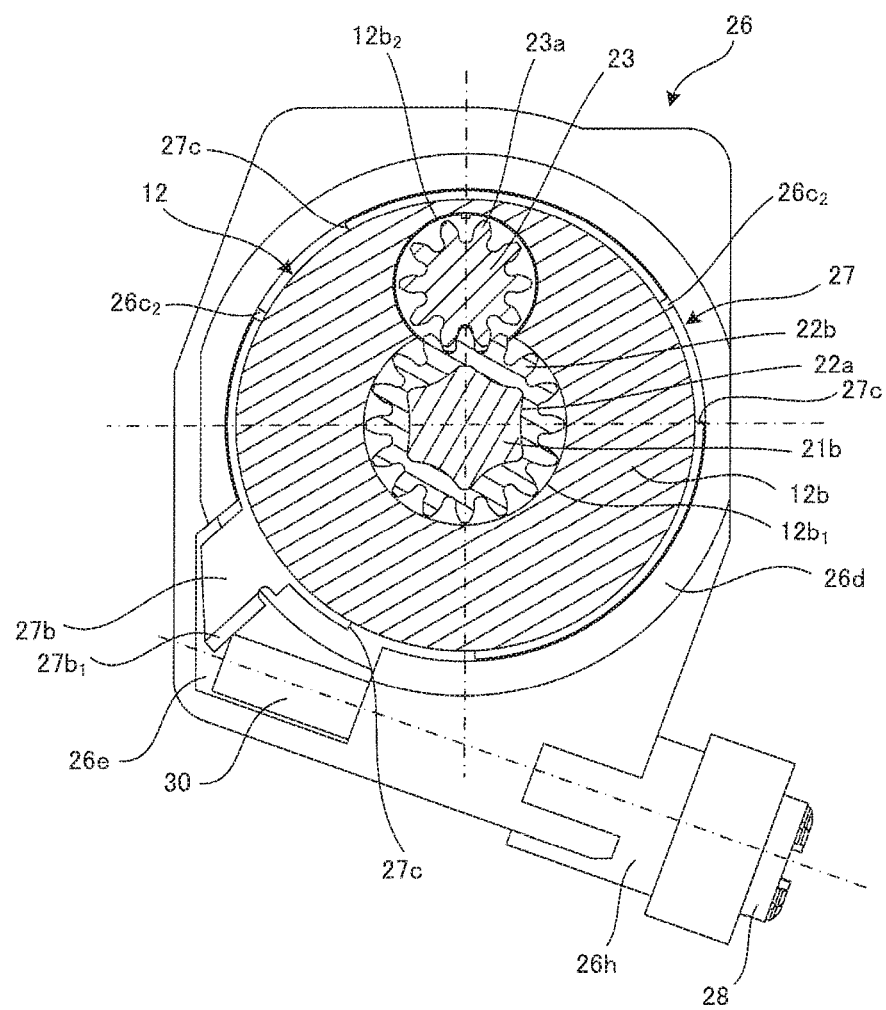
FIG. 15 is a cross-sectional view taken along a line C-C in FIG. 7, showing a state after the micro gas generator is activated.
Figure 16:
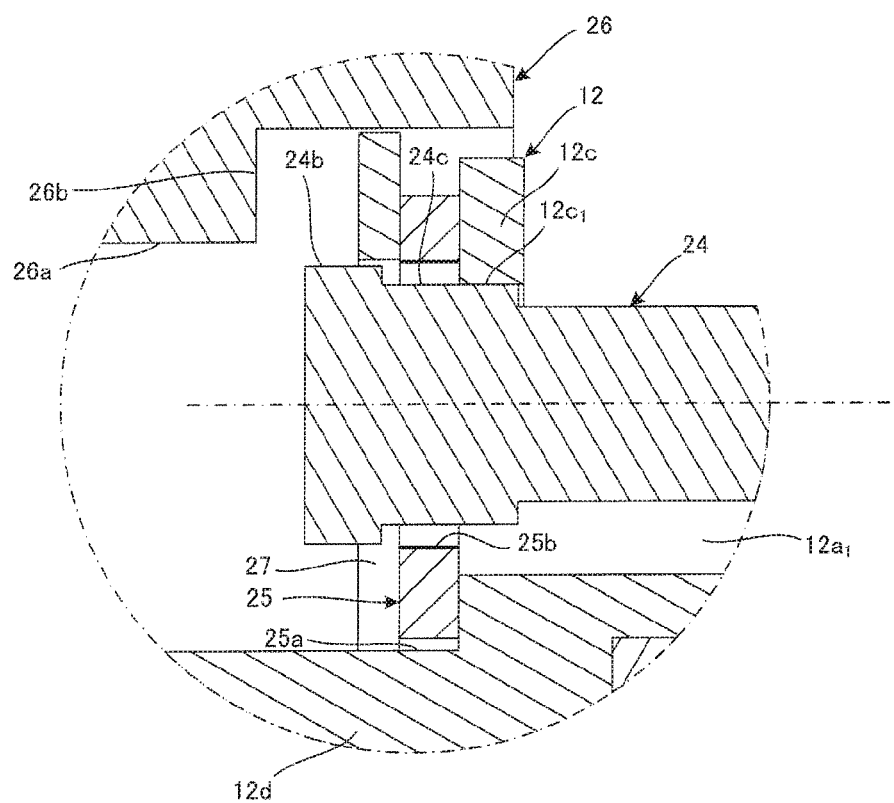
FIG. 16 is an enlarged cross-sectional view of the portion indicated by D in FIG. 8, showing a state after the micro gas generator is activated.

FIG. 12 is a perspective view showing a part of the EA mechanism 20 of the seatbelt retractor according to this embodiment, in a state after the micro gas generator is activated. FIG. 13 is a perspective view showing the housing of the EA mechanism 20 of the seatbelt retractor according to this embodiment, in a state after the micro gas generator is activated. FIG. 14 is a cross-sectional view taken along a line B-B in FIG. 7, showing a state after the micro gas generator is activated. FIG. 15 is a cross-sectional view taken along a line C-C in FIG. 7, showing a state after the micro gas generator is activated. FIG. 16 is an enlarged cross-sectional view of the portion indicated by D in FIG. 8, showing a state after the micro gas generator is activated.

In the second operation mode, the EA mechanism 20 assumes the state illustrated in FIG. 12 to FIG. 16, because the micro gas generator 28 is activated. After the pretensioner mechanism 50 is activated and the spool 12 rotates in the retracting direction, the spool 12 is urged to rotate in the belt withdrawal direction because the seatbelt 4 is about to be withdrawn by the inertia of the occupant. However, the locking base 62 and the first gear 22 attached to the first flange 12b of the spool 12 are locked by the lock pawl 61.

Accordingly, the first torsion bar 21, having one end portion 21a retained by the spool 12 and the other end portion 21b retained by the first gear 22, suffers distortion. In other words, the first torsion bar 21 allows the seatbelt 4 to be withdrawn by a predetermined amount, while being subjected to a force limiter load, thereby absorbing the energy.

In the second operation mode, the micro gas generator 28 is activated so as to shoot the piston 30. The piston 30 presses the abutment $27b_1$ of the lever portion 27b of the lever ring 27. Accordingly, the lever ring 27 starts to rotate because the lever portion 27b has been pressed. Then the ring portion 27a of the lever ring 27 moves along the sloped surface $26c_1$ of the cam portion 26c formed in the annular stepped portion 26b of the housing 26, formed in the cutaway portion 27c, and climbs up to the top surface $26c_2$.

At this point, the lever ring 27 which has moved presses the release ring 25, so that the release ring 25 is moved in the axial direction. Then the retention hole 25b of the release ring 25 moves to the position corresponding to the minor-diameter portion 24c of the second torsion bar 24, and the other end portion 24b of the second torsion bar 24 is separated from the release ring 25, so as to freely rotate with respect to the release ring 25. Accordingly, the second torsion bar 24 and the second gear 23 are allowed to rotate interlocked with each other, and hence the second torsion bar 24 is not subjected to distortion. In other words, the force limiter load is not applied to the second torsion bar 24.

Thus, in the second operation mode of the seatbelt retractor 3 according to this embodiment, in which the micro gas generator 28 is activated, only the first torsion bar 21 acts to absorb the energy.

Hereunder, the control of the seatbelt retractor according to this embodiment will be described.

Figure 17:
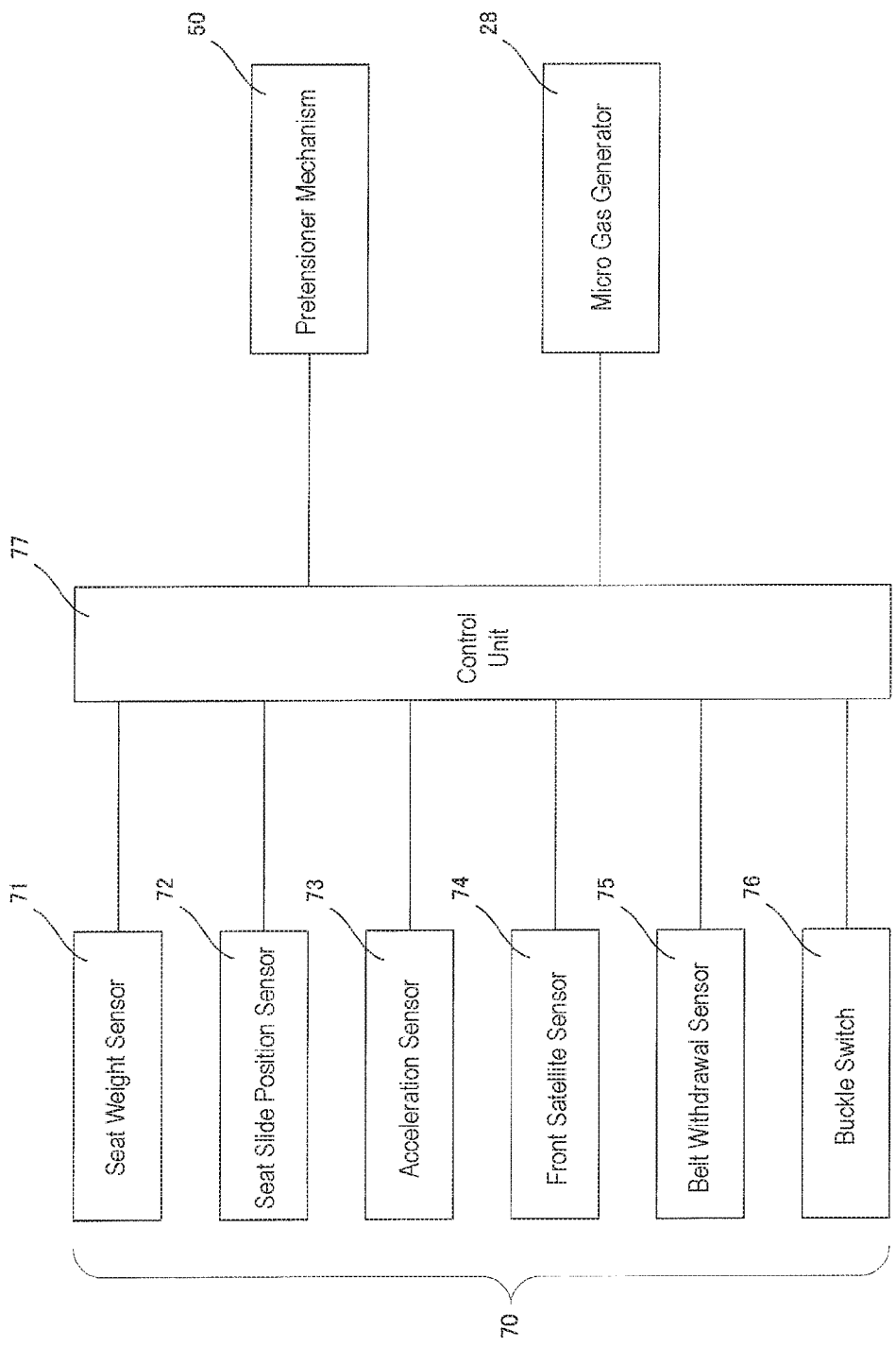
FIG. 17 is a block diagram showing a system configuration of the EA mechanism of the seatbelt retractor according to the embodiment.

FIG. 17 is a block diagram showing a system configuration of the EA mechanism of the seatbelt retractor according to this embodiment.

Referring to FIG. 17, in the seatbelt retractor according to this embodiment a control unit 77 controls the operation of the pretensioner mechanism 50 and the micro gas generator 28 in accordance with the situation of emergency cases, on the basis of output signals from a seat weight sensor 71, a seat slide position sensor 72, an acceleration sensor 73, a front satellite sensor 74, a belt withdrawal sensor 75, and an occupant information acquisition unit 70 such as a buckle switch 76. The control unit 77 is constituted of a CPU or the like.

Figure 18:
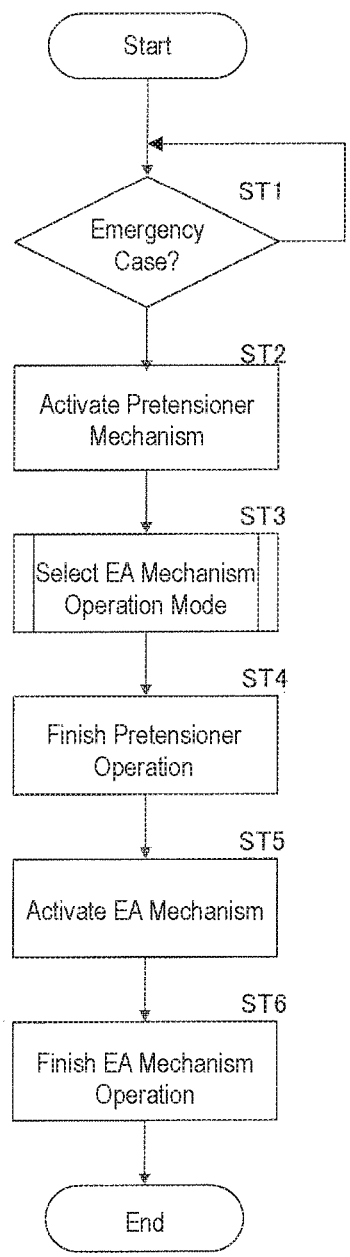
FIG. 18 is an operation flowchart of the seatbelt retractor according to the embodiment.
Figure 19:
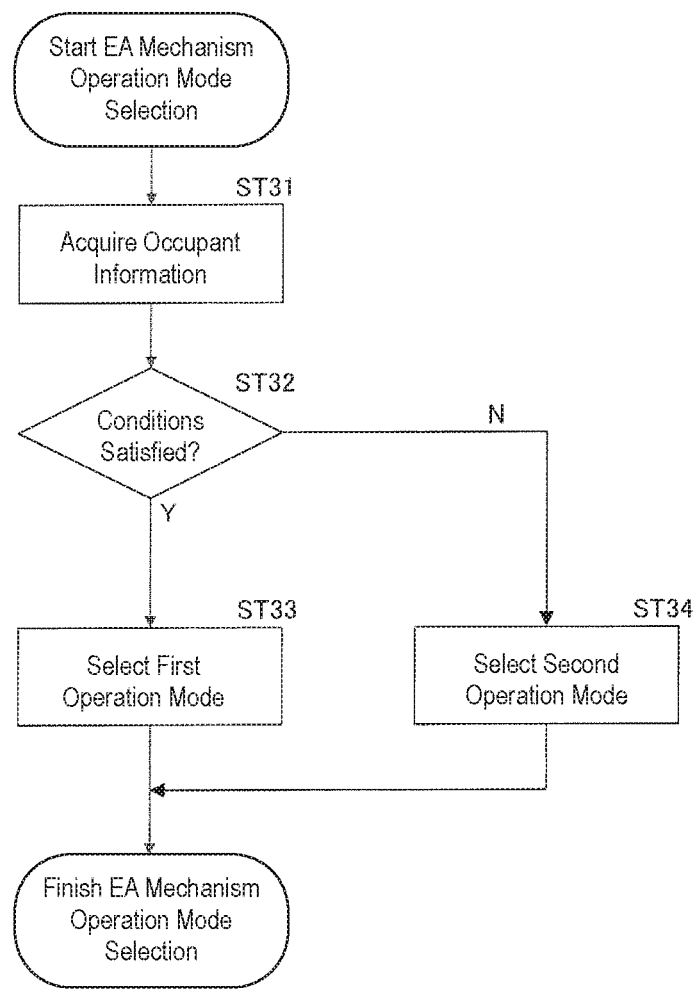
FIG. 19 is an operation flowchart of the EA mechanism of the seatbelt retractor according to the embodiment.

FIG. 18 is an operation flowchart of the seatbelt retractor according to this embodiment. FIG. 19 is an operation flowchart of the EA mechanism of the seatbelt retractor according to this embodiment.

First, it is decided whether an emergency case has occurred, at step 1 (ST1). The decision of the emergency case is made depending on whether the acceleration sensor 73 has detected sudden deceleration exceeding a predetermined threshold, originating from collision or the like. In the case where it is decided at step 1 that the emergency case has not occurred, the operation returns to step 1.

In the case where it is decided at step 1 that the emergency case has occurred, the pretensioner mechanism 50 is activated at step 2 (ST2).

Then EA mechanism operation mode selection is performed at step 3 (ST3).

In the EA mechanism operation mode selection, first, occupant information is acquired at step 31 (ST31). The occupant information may be acquired from the sensors shown in FIG. 17.

At step 32, it is decided whether the occupant information acquired at step 31 satisfies a predetermined condition (ST32). For example, it may be decided whether the load acquired by the seat weight sensor 71 is equal to or higher than a predetermined value, or smaller than that.

In the case where the predetermined condition is satisfied at step 32, the first operation mode in which the micro gas generator 28 is not activated is selected at step 33 (ST33). In the case where the predetermined condition is not satisfied at step 32, the second operation mode in which the micro gas generator 28 is activated is selected at step 34 (ST34). Upon selecting the operation mode of the EA mechanism, the EA mechanism operation mode selection is finished.

For example, in the case where the weight acquired by the seat weight sensor 71 is heavier than the predetermined value, the first operation mode is selected, and in the case where the weight acquired by the seat weight sensor 71 is lighter than the predetermined value, the second operation mode is selected.

Then the operation of the pretensioner mechanism 50 is finished at step 4 (ST4).

At step 5, the EA mechanism 20 is activated in the operation mode selected at the EA mechanism operation mode selection process of step 3 (ST5).

At step 6, the operation of the EA mechanism 20 is finished (ST6).

Figure 20:
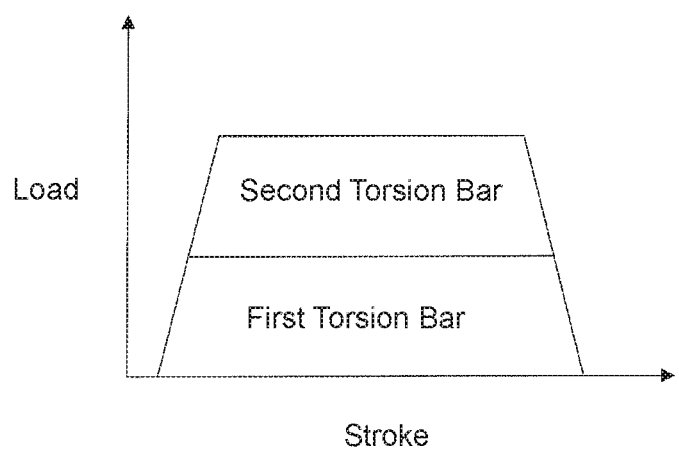
FIG. 20 is a graph showing a load applied to a stroke in a first operation mode of the EA mechanism of the seatbelt retractor according to the embodiment.
Figure 21:
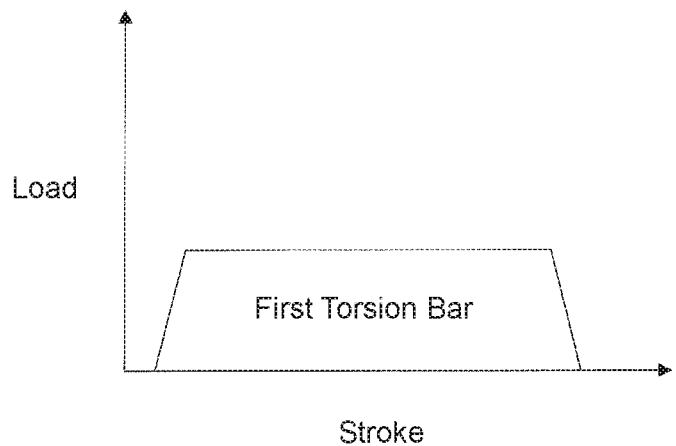
FIG. 21 is a graph showing a load applied to the stroke in a second operation mode of the EA mechanism of the seatbelt retractor according to the embodiment.

FIG. 20 is a graph showing the load applied to the stroke in the first operation mode of the EA mechanism of the seatbelt retractor according to this embodiment. FIG. 21 is a graph showing the load applied in the second operation mode to the stroke of the EA mechanism of the seatbelt retractor according to the embodiment.

Thus, the seatbelt retractor 3 according to this embodiment is configured to switch the load limit of the seatbelt 4 in an emergency case, utilizing the second torsion bar 24 to be selectively activated depending on the information known in advance (for example, occupant's weight information, seat-slide position information), collision prediction information, and information regarding the situation of the emergency case, such as information on severeness of the collision (for example, collision velocity information, collision acceleration/deceleration information, information on the form of the collision).

More specifically, when the first gear 22 is restricted from rotating in the seatbelt withdrawal direction so that the spool 12 rotates in the seatbelt withdrawal direction relative to the first gear 22, it is selected whether the load applied to the seatbelt 4 is limited by both of the first torsion bar 21 and the second torsion bar 24, or only by the first torsion bar 21.

Therefore, the load limit of the seatbelt in the emergency case such as collision can be determined on the basis of the situation of the emergency case and the information such as the body size of the occupant present in the emergency case. Such an arrangement enables the occupant to be bound more effectively and more properly, in the emergency case.

Further, since the second torsion bar 24 is located inside the spool 12, the seatbelt retractor 3 can be formed in a smaller size in the vertical direction. Therefore, a larger effective space can be secured inside the vehicle interior.

Here, although the micro gas generator 28 is employed as driving mechanism for pressing the lever portion 27b of the lever ring 27 in the foregoing embodiment, the present invention is not limited to such a configuration. The lever portion 27b may be pressed by a different drive mechanism, for example by an electromagnetic solenoid that employs electromagnetic force to press the lever portion 27b. In this case, the electromagnetic solenoid may be controlled by the control unit 77 in the same way as described above.

The seatbelt retractor configured as above according to the foregoing embodiment includes the frame 11, the seatbelt 4, the spool 12 that takes up the seatbelt 4, the spool 12 being rotatably supported by the frame 11, the lock mechanism 60 that allows the spool 12 to rotate in a non-activated state and restricts, upon being activated, the spool 12 from rotating in the seatbelt withdrawal direction, and the energy absorption mechanism 20 that limits the load applied to the seatbelt 4 to thereby absorb and alleviate energy of the occupant, and the energy absorption mechanism 20 includes the first torsion bar 21 concentrically enclosed in the spool 12 with one end portion 21a retained by the spool 12 and the other end portion 21b disposed to be locked by the lock mechanism 60, and disposed to be rotated by torsional force, the second torsion bar 24 eccentrically enclosed in the spool 12 with one end portion 24a disposed to be locked by the lock mechanism 60, and disposed to be rotated by torsional force, and the release ring 25 that rotates interlocked with the spool 12, and moves between the first position for retaining the other end portion 24b of the second torsion bar 24 and the second position spaced from the other end portion 24b of the second torsion bar 24. Therefore, the seatbelt retractor can be formed in a smaller size, yet can be properly operated, and is capable of smoothly providing the seatbelt tension.

In the seatbelt retractor according to the present invention, the energy absorption mechanism 20 includes the first gear 22 that retains the other end portion of the first torsion bar 21, the first gear 22 being disposed to be locked by the lock mechanism 60, and the second gear 23 meshed with the first gear 22 and retaining the one end portion 24a of the second torsion bar 24. Therefore, the first torsion bar 21 and the second torsion bar 24 can be securely connected to each other.

In the seatbelt retractor according to the present invention, the energy absorption mechanism 20 includes the lever ring 27 that moves the release ring 25 to the first position and the second position, the micro gas generator 28 that drives the lever ring 27, and the housing 26 movably supporting the lever ring 27 and accommodating therein the micro gas generator 28. Therefore, the lever ring 27 can be driven to move the release ring 25 by the micro gas generator 28 mounted in the solid housing 26, and thus the components interact more properly with each other to perform accurate operations.

In the seatbelt retractor according to the present invention, the housing 26 includes the cam portion 26c spaced from the lever ring 27 before the micro gas generator 28 is activated, and contacted by the lever ring 27 when the micro gas generator 28 is activated. Moving thus the release ring 25 by bringing the lever ring 27 into contact with the cam portion 26c allows a more accurate operation to be performed.

The seatbelt retractor according to the present invention further includes the occupant information acquisition unit 70 that acquires occupant information, and the control unit 77 that decides whether the information acquired by the occupant information acquisition unit 70 satisfies the predetermined condition, and moves the release ring 25, depending on the decision result, to the first position for retaining the other end portion 24b of the second torsion bar 24 and the second position spaced from the other end portion 24b of the second torsion bar 24. Therefore, the seatbelt retractor can be controlled in accordance with the condition of the occupant, thus to be more properly operated.

The seatbelt retractor according to the present invention further includes the pretensioner mechanism 50 that rotates the spool 12 in the retracting direction of the seatbelt 4 in an emergency case, and the control unit may decide whether the information acquired by the occupant information acquisition unit 70 satisfies the predetermined condition, after activating the pretensioner mechanism 50 in the emergency case. The mentioned configuration enables the seatbelt 4 to be quickly retracted in the emergency case.

The seatbelt assembly including the seatbelt retractor 3 according to the foregoing embodiment, which can be formed in a smaller size, allows the components of the seatbelt assembly to be arranged with a higher degree of designing freedom.

The present invention is applicable to a seatbelt retractor for a seatbelt assembly equipped in a vehicle such as an automobile, and particularly suitable to a seatbelt retractor that restricts the seatbelt from being withdrawn in an emergency case such as collision, while limiting a load applied to the seatbelt thereby absorbing and alleviating the energy of the occupant.

The invention claimed is:

1. A seatbelt retractor comprising:
a frame;
a seatbelt;
a spool that takes up the seatbelt, the spool being rotatably supported by the frame;
a lock mechanism that allows the spool to rotate in a non-activated state and restricts, upon being activated, the spool from rotating in a seatbelt withdrawal direction; and
an energy absorption mechanism that limits a load applied to the seatbelt to thereby absorb and alleviate energy of an occupant,
wherein the energy absorption mechanism includes:
a first torsion bar concentrically enclosed in the spool with one end portion retained by the spool and an opposite end portion disposed to be locked by the lock mechanism, and disposed to be rotated by torsional force;
a second torsion bar eccentrically enclosed in the spool with one end portion disposed to be locked by the lock mechanism, and disposed to be rotated by torsional force; and
a moving member that rotates interlocked with the spool, and moves between a first position for retaining an opposite end portion of the second torsion bar and a second position spaced from the opposite end portion of the second torsion bar.

2. The seatbelt retractor according to claim 1, wherein the energy absorption mechanism includes:
a first gear that retains the other end portion of the first torsion bar, the first gear being disposed to be locked by the lock mechanism; and
a second gear meshed with the first gear and retaining the one end portion of the second torsion bar.

3. The seatbelt retractor according to claim 1, wherein the energy absorption mechanism includes:
a pressing member that moves the moving member to the first position and the second position;
a drive mechanism that drives the pressing member; and
a housing movably supporting the pressing member and accommodating therein the drive mechanism.

4. The seatbelt retractor according to claim 3, wherein the housing includes a cam portion spaced from the pressing member before the drive mechanism is activated, and contacted by the pressing member when the drive mechanism is activated.

5. The seatbelt retractor according to claim 4, further comprising:
an occupant information acquisition unit that acquires occupant information; and
a control unit that decides whether the information acquired by the occupant information acquisition unit satisfies a predetermined condition, and moves the moving member, depending on a decision result, to the first position for retaining the opposite end portion of the second torsion bar and the second position spaced from the opposite end portion of the second torsion bar.

6. The seatbelt retractor according to claim 5, further comprising a pretensioner mechanism that rotates the spool in a seatbelt retracting direction in an emergency case,
wherein the control unit decides whether the information acquired by the occupant information acquisition unit satisfies the predetermined condition, after activating the pretensioner mechanism in the emergency case.

7. A seatbelt assembly comprising at least:
the seatbelt retractor of claim 1 that withdrawably retracts the seatbelt and restricts the seatbelt from being withdrawn upon being activated in an emergency case;
a tongue slidably supported by the seatbelt withdrawn from the seatbelt retractor; and
a buckle attached to a vehicle body or a vehicle seat to be removably engaged with the tongue.

* * * * *